US010121048B2

(12) United States Patent
Yang et al.

(10) Patent No.: US 10,121,048 B2
(45) Date of Patent: Nov. 6, 2018

(54) OPERATING METHOD FOR A FINGERPRINT SENSING DEVICE AND FINGERPRINT SENSING SYSTEM

(71) Applicant: ELAN MICROELECTRONICS CORPORATION, Hsin Chu (TW)

(72) Inventors: Chao-Chi Yang, Hsinchu (TW); Jui-Che Lin, Miaoli County (TW); Tung-An Yao, Hsinchu (TW); Chung-Han Cheng, Kaohsiung (TW); Chung-An Tang, Zhubei (TW)

(73) Assignee: ELAN MICROELECTRONICS CORPORATION, Hsin Chu (TW)

( * ) Notice: Subject to any disclaimer, the term of this patent is extended or adjusted under 35 U.S.C. 154(b) by 136 days.

(21) Appl. No.: 15/398,435

(22) Filed: Jan. 4, 2017

(65) Prior Publication Data

US 2018/0032779 A1 Feb. 1, 2018

Related U.S. Application Data

(60) Provisional application No. 62/368,172, filed on Jul. 29, 2016.

(30) Foreign Application Priority Data

Oct. 24, 2016 (TW) .............................. 105134353 A

(51) Int. Cl.
*G06K 9/00* (2006.01)
(52) U.S. Cl.
CPC .................. *G06K 9/0002* (2013.01)

(58) Field of Classification Search
CPC ................. G06K 9/002; G09G 3/3208; G09G 2300/0426
See application file for complete search history.

(56) References Cited

U.S. PATENT DOCUMENTS

| 7,158,070 B1 * | 1/2007 | Yang ................... H03M 1/1019 341/155 |
| D673,567 S * | 1/2013 | Yang ............................ D14/434 |
| D680,122 S * | 4/2013 | Yang ............................ D14/447 |
| 9,721,140 B2 * | 8/2017 | Yang .................... G06K 9/0002 |
| 9,965,097 B2 * | 5/2018 | Yang .................... G06F 3/0412 |

(Continued)

OTHER PUBLICATIONS

Taiwan Patent Office, Office Action, Patent Application Serial No. TW105134353, dated Apr. 21, 2017 Taiwan.

*Primary Examiner* — Chan Park
*Assistant Examiner* — Mia M Thomas
(74) *Attorney, Agent, or Firm* — Rabin & Berdo, P.C.

(57) ABSTRACT

A fingerprint sensing system has a fingerprint sensing device and a power supply circuit. The fingerprint sensing device has a high-voltage input terminal and a low-voltage input terminal. During scan phases of the fingerprint sensing device, the power supply circuit provides a first voltage to the high voltage input terminal and provides a second voltage to the low voltage input terminal. During the read phases of the fingerprint sensing device, the power supply circuit provides a third voltage to the high voltage input terminal and provides a fourth voltage to the low voltage input terminal. A first voltage difference is between the first voltage and the second voltage. A second voltage difference is between the third voltage and the fourth voltage. The first voltage difference is greater than the second voltage difference.

29 Claims, 13 Drawing Sheets

(56) References Cited

U.S. PATENT DOCUMENTS

| | | | | |
|---|---|---|---|---|
| 9,984,275 B2* | 5/2018 | Chiang | | G06K 9/0002 |
| 2002/0188855 A1* | 12/2002 | Nakayama | | G06F 21/32 |
| | | | | 713/186 |
| 2007/0089914 A1* | 4/2007 | Yang | | G06F 3/045 |
| | | | | 178/18.05 |
| 2008/0158028 A1* | 7/2008 | Yang | | H03M 1/109 |
| | | | | 341/118 |
| 2012/0154298 A1* | 6/2012 | Wu | | G06F 3/0416 |
| | | | | 345/173 |
| 2012/0234340 A1* | 9/2012 | Firkins | | A61K 8/00 |
| | | | | 132/212 |
| 2012/0274340 A1* | 11/2012 | Yang | | G01D 5/24 |
| | | | | 324/680 |
| 2012/0280700 A1* | 11/2012 | Yang | | G01D 5/24 |
| | | | | 324/679 |
| 2013/0335376 A1* | 12/2013 | Lee | | G06F 3/0416 |
| | | | | 345/174 |
| 2015/0015537 A1* | 1/2015 | Riedijk | | G06F 3/044 |
| | | | | 345/174 |
| 2015/0089086 A1* | 3/2015 | Yang | | G06F 13/122 |
| | | | | 710/5 |
| 2015/0346253 A1 | 12/2015 | Wang et al. | | |
| 2016/0092716 A1 | 3/2016 | Yazdandoost et al. | | |
| 2016/0171272 A1* | 6/2016 | Yang | | G06K 9/0002 |
| | | | | 324/679 |
| 2016/0171275 A1* | 6/2016 | Wang | | G06K 9/00053 |
| | | | | 382/124 |
| 2016/0188948 A1* | 6/2016 | Yang | | G06K 9/0002 |
| | | | | 382/124 |
| 2016/0188949 A1* | 6/2016 | Yang | | G06K 9/0002 |
| | | | | 382/124 |
| 2016/0239700 A1* | 8/2016 | Yang | | G06K 9/0002 |
| 2016/0253014 A1* | 9/2016 | Yang | | G09G 3/32 |
| | | | | 345/174 |
| 2016/0253541 A1* | 9/2016 | Yang | | G09G 3/32 |
| | | | | 382/124 |
| 2016/0291743 A1* | 10/2016 | Yang | | G09G 3/3258 |
| 2018/0032779 A1* | 2/2018 | Yang | | G06K 9/0002 |
| 2018/0120993 A1* | 5/2018 | Kurasawa | | G02F 1/13338 |

* cited by examiner

OPERATING METHOD FOR A FINGERPRINT SENSING DEVICE AND FINGERPRINT SENSING SYSTEM

CROSS REFERENCE TO RELATED APPLICATIONS

This non-provisional application claims the benefit under 35 U.S.C. § 119(e) to U.S. Provisional Application No. 62/368,172 filed on Jul. 29, 2016 and under 35 U.S.C. § 119(a) to Patent Application No. 105134353 filed in Taiwan on Oct. 24, 2016, all of which are hereby expressly incorporated by reference into the present application.

BACKGROUND OF THE INVENTION

1. Field of the Invention

The present invention relates to a sensing device and, more particularly, to an operating method for a fingerprint sensing device and a fingerprint sensing system.

2. Description of the Related Art

U.S. Patent Publication No. 2015/0015537A1 (hereinafter reference application) discloses a fingerprint sensing system and a method therefor. With reference to FIGS. 3 and 5 of the reference application, a power supply circuit outputs a first power signal $V_H$ and a second power signal $V_L$ to a fingerprint sensing device. There is a difference value $V_{CC}$ between the first power signal $V_H$ and the second power signal $V_L$ (i.e. $V_{CC}=V_H-V_L$), and the difference value $V_{CC}$ is a constant value.

SUMMARY OF THE INVENTION

An objective of the present invention is to provide an operating method for a fingerprint sensing device and a fingerprint sensing system for increasing signal amplitude sensed by the fingerprint sensing device and reducing noise interference.

To achieve the foregoing objective, the fingerprint sensing device comprises multiple sensors, a high-voltage input terminal and a low-voltage input terminal, wherein the fingerprint sensing device obtains power through the high-voltage input terminal and the low-voltage input terminal to sense the multiple sensors, the method of the present invention comprises:

in a scan phase of the fingerprint sensing device, providing a first voltage to the high-voltage input terminal and providing a second voltage to the low-voltage input terminal to cause a first voltage difference between the high-voltage input terminal and the low-voltage input terminal, wherein the first voltage is greater than the second voltage; and in a read phase of the fingerprint sensing device, providing a third voltage to the high-voltage input terminal and providing a fourth voltage to the low-voltage input terminal to cause a second voltage difference between the high-voltage input terminal and the low-voltage input terminal, wherein the third voltage is greater than the fourth voltage;

wherein the first voltage difference is greater than the second voltage difference.

The fingerprint sensing system of the present invention comprises:

a fingerprint sensing device comprising multiple sensors, a high-voltage input terminal and a low-voltage input terminal, wherein the fingerprint sensing device obtains power through the high-voltage input terminal and the low-voltage input terminal to sense the multiple sensors; and a power supply circuit coupled to the high-voltage input terminal and the low-voltage input terminal of the fingerprint sensing device, and supplying a first voltage, a second voltage, a third voltage and a fourth voltage, wherein the first voltage is greater than the second voltage, and the third voltage is greater than the fourth voltage;

wherein in a scan phase of the fingerprint sensing device, the power supply circuit provides the first voltage to the high-voltage input terminal and provides the second voltage to the low-voltage input terminal to cause a first voltage difference between the high-voltage input terminal and the low-voltage input terminal;

in a read phase of the fingerprint sensing device, the power supply circuit provides the third voltage to the high-voltage input terminal and provides the fourth voltage to the low-voltage input terminal to cause a second voltage difference between the high-voltage input terminal and the low-voltage input terminal; and the first voltage difference is greater than the second voltage difference.

According to the present invention, fingerprint sensing signals with higher signal amplitude can be acquired during the scan phase, and noise interference can be reduced during the read phase.

Other objectives, advantages and novel features of the invention will become more apparent from the following detailed description when taken in conjunction with the accompanying drawings.

DETAILED DESCRIPTION OF THE INVENTION

Figure 1:
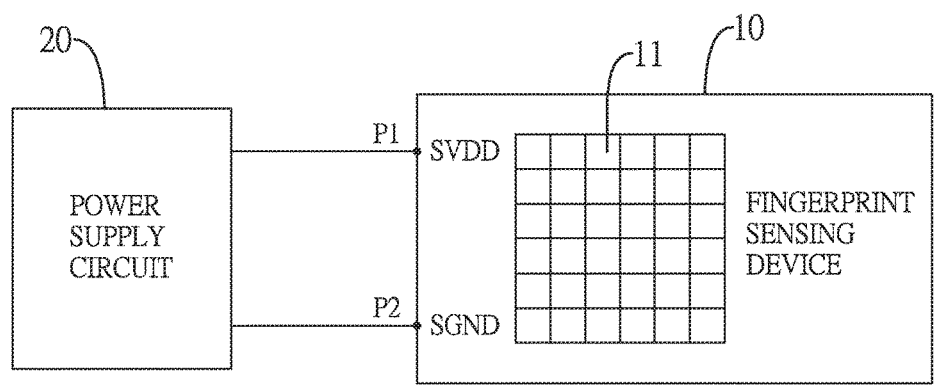
FIG. 1 is a block diagram of a fingerprint sensing system in accordance with the present invention.

With reference to FIG. 1, an embodiment of a fingerprint sensing system in accordance with the present invention comprises a fingerprint sensing device 10 and a power supply circuit 20. The fingerprint sensing device 10 comprises multiple sensors 11, a high-voltage input terminal SVDD and a low-voltage input terminal SGND. The fingerprint sensing device 10 obtains power through the high-voltage input terminal SVDD and the low-voltage input terminal SGND to sense the multiple sensors 11. In one embodiment, each sensor 11 may be an independent electrode and the multiple sensors 11 are arranged in the form of a matrix. The power supply circuit 20 is coupled to the high-voltage input terminal SVDD and the low-voltage input terminal SGND to power the fingerprint sensing device 10 for sensing a fingerprint by the multiple sensors 11. The power supply circuit 20 supplies a first power signal P1 to the high-voltage input terminal SVDD of the fingerprint sensing device 10, and a second power signal P2 to the low-voltage input terminal SGND of the fingerprint sensing device 10. Voltage variations of the high-voltage input terminal SVDD and the low-voltage input terminal SGND are respectively shown by the first power signal P1 and the second power signal P2. The fingerprint sensing device 10 further comprises a sensing circuit (not shown) coupled to the multiple sensors 11 to sense the multiple sensors 11. The operations of the fingerprint sensing device 10 include a scan phase and a read phase, wherein the scan phase and the read phase are performed alternately. During the scan phase, the multiple sensors 11 are driven and sensed to generate multiple fingerprint sensing signals. During the read phase, the fingerprint sensing signals are read out. In one embodiment, the fingerprint sensing signals may be read and an analog-to-digital conversion for the fingerprint sensing signals is performed during the read phase.

Figure 2:
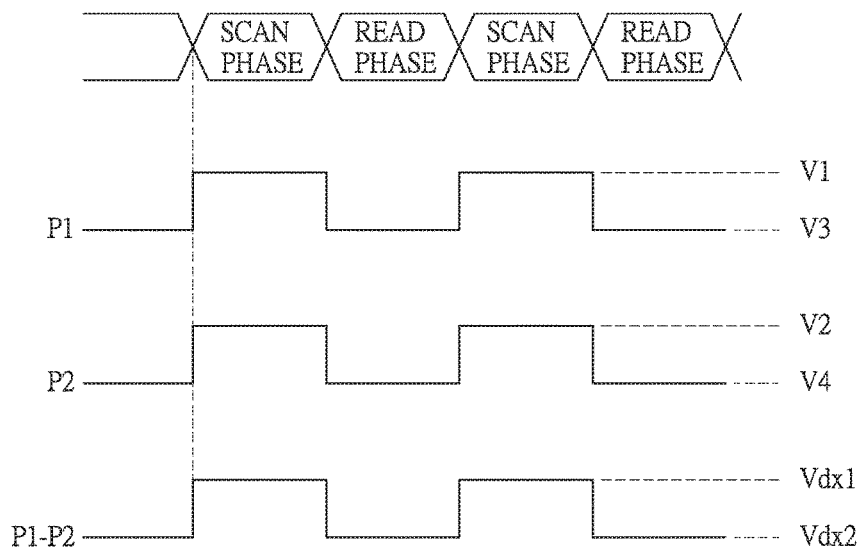
FIG. 2 is a waveform of a first embodiment of a first power signal and a second power signal in accordance with the present invention.

With reference to FIG. 2, a first embodiment of an operating method for a fingerprint sensing system in accordance with the present invention is shown. P1−P2 represents a voltage difference between the first power signal P1 and the second power signal P2, i.e. the voltage difference between the high-voltage input terminal SVDD and the low-voltage input terminal SGND. During the scan phase of the fingerprint sensing device 10, the power supply circuit 20 supplies a first voltage V1 to the high-voltage input terminal SVDD and a second voltage V2 to the low-voltage input terminal SGND. The first voltage V1 is greater than the second voltage V2. In this time, the first power signal P1 has a first voltage V1 and the second power signal P2 has a second voltage V2. There is a first voltage difference Vdx1 (Vdx1=V1−V2) between the high-voltage input terminal SVDD and the low-voltage input terminal SGND.

During the read phase of the fingerprint sensing device 10, the power supply circuit 20 supplies a third voltage V3 to the high-voltage input terminal SVDD and a fourth voltage V4 to the low-voltage input terminal SGND. The third voltage V3 is greater than the fourth voltage V4. In this time, the first power signal P1 has a third voltage V3 and the second power signal P2 has a fourth voltage V4. There is a second voltage difference Vdx2 (Vdx2=V3−V4) between the high-voltage input terminal SVDD and the low-voltage input terminal SGND. The first voltage difference Vdx1 is greater than the second voltage difference Vdx2. According to the foregoing description, the fingerprint sensing device 10 scans the multiple sensors 11 when the first voltage difference Vdx1 is between the high-voltage input terminal SVDD and the low-voltage input terminal SGND. When reading the fingerprint sensing signals from the multiple sensors 11, the voltage difference between the high-voltage input terminal SVDD and the low-voltage input terminal SGND is lowered to the second voltage difference Vdx2. Thus, during the operation of the fingerprint sensing device 10, the voltage difference between the high-voltage input terminal SVDD and the low-voltage input terminal SGND is not a constant value. As such, operation of the present invention is different from that of the US patent publication no. 2015/0015537A1.

For example, the first voltage V1 to the fourth voltage V4 may be as follows:

the first voltage $V1=A*VDD$ the second voltage $V2=(A-1)*VDD$ the third voltage $V3=B*VDD$ the fourth voltage $V4=VGND$ where A is a positive number or a positive integer greater than 1, in an embodiment is equal to 2; B is less than 1 (e.g. 0.8); VGND is a ground voltage externally supplied to the power supply circuit 20 and may be for example, zero; and VDD is an operating voltage externally supplied to the power supply circuit 20. In this example, the first voltage difference Vdx1 during the scan phase is equal to V1−V2=VDD, and the second voltage difference Vdx2 during the read phase is equal to V3−V4=B*VDD.

In further, following embodiments and figures are provided to explain how the power supply circuit 20 supplies the first power signal P1 and the second power signal P2 to the fingerprint sensing device 10.

Figure 3:
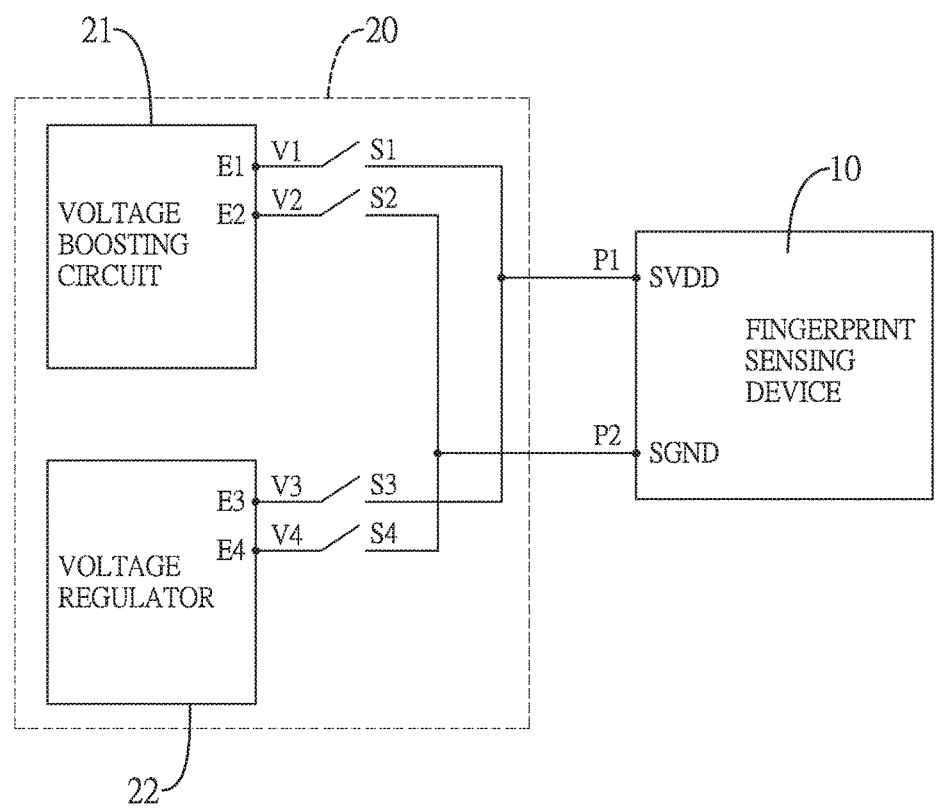
FIG. 3 is a functional block diagram of a first embodiment of the fingerprint sensing system in accordance with the present invention.

With reference to FIG. 3, the power supply circuit 20 comprises a voltage boosting circuit 21 and a voltage regulator 22. The voltage boosting circuit 21 comprises a first voltage terminal E1 for providing the first voltage V1 and a second voltage terminal E2 for providing the second voltage V2. The first voltage V1 is greater than the second voltage V2. The voltage regulator 22 comprises a third voltage terminal E3 for providing the third voltage V3 and a fourth voltage terminal E4 for providing the fourth voltage V4. The third voltage V3 is greater than the fourth voltage V4. The power supply circuit 20 further comprises multiple switches. A first switch S1 is coupled between the first voltage terminal E1 and the high-voltage input terminal SVDD of the fingerprint sensing device 10. A second switch S2 is coupled between the second voltage terminal E2 and the low-voltage input terminal SGND of the fingerprint sensing device 10. A third switch S3 is coupled between the third voltage terminal E3 and the high-voltage input terminal SVDD of the fingerprint sensing device 10. A fourth switch S4 is coupled between the fourth voltage terminal E4 and the low-voltage input terminal SGND of the fingerprint sensing device 10. The voltage boosting circuit 21 and the voltage regulator 22 supply the first power signal P1 to the high-voltage input terminal SVDD of the fingerprint sensing device 10 through the first switch S1 and the third switch S3.

The voltage boosting circuit 21 and the voltage regulator 22 supply the second power signal P2 to the low-voltage input terminal SGND of the fingerprint sensing device 10 through the second switch S2 and the fourth switch S4.

Figure 4:
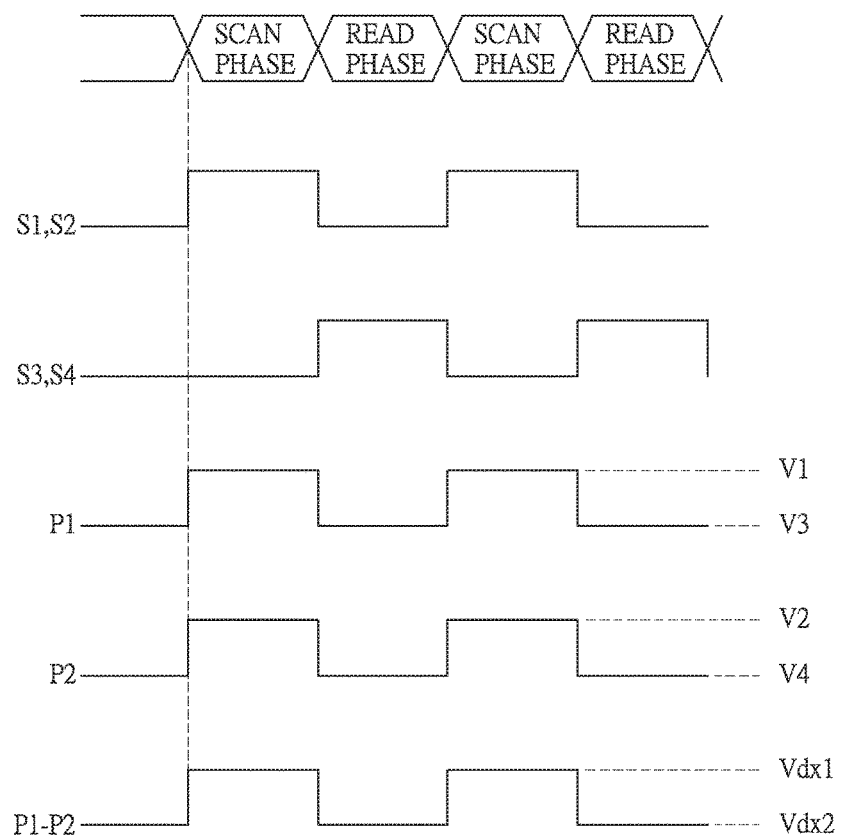
FIG. 4 is a timing sequence diagram of the fingerprint sensing system in FIG. 3.

With reference to FIG. 4, a timing sequence diagram for the embodiment in FIG. 3 is shown. "S1, S2" represents a waveform of control signals for the first switch S1 and the second switch S2. "S3, S4" represents a waveform of control signals for the third switch S3 and the fourth switch S4. For each one of the control signals of the multiple switches S1~S4, a high voltage level indicates a closed (ON) state of the switch, and a low voltage level indicates an open (OFF) state of the switch.

During the scan phase of the fingerprint sensing device 10, the first switch S1 and the second switch S2 are closed (ON), and the third switch S3 and the fourth switch S4 are open (OFF). The voltage of the first power signal P1 is the first voltage V1, the voltage of the second power signal P2 is the second voltage V2, and the voltage difference between the high-voltage input terminal SVDD and the low-voltage input terminal SGND is the first voltage difference Vdx1. During the read phase of the fingerprint sensing device 10, the first switch S1 and the second switch S2 are open, and the third switch S3 and the fourth switch S4 are closed. The voltage of the first power signal P1 is the third voltage V3, the voltage of the second power signal P2 is the fourth voltage V4, and the voltage difference between the high-voltage input terminal SVDD and the low-voltage input terminal SGND is the second voltage difference Vdx2.

During the scan phase, providing the first voltage V1 and the second voltage V2 with higher voltage level to the high-voltage input terminal SVDD and the low-voltage input terminal SGND is beneficial to obtain higher fingerprint sensing signals when the sensors 11 are sensed. The higher the fingerprint sensing signals are, the easier the fingerprint sensing signals corresponding to ridges or valleys of fingerprints can be correctly identified. During the read phase, the voltage regulator 22 provides the third voltage V3 and the fourth voltage V4 with low noise and high stability, which is beneficial to reduce noise interference while reading the fingerprint sensing signals. Because the second voltage difference Vdx2 during the read phase is lower than the first voltage difference Vdx1 during the scan phase, the power can be saved. In one embodiment, the third voltage V3, the fourth voltage V4 and the second voltage difference Vdx2 may be minimum values required by analog circuits in the fingerprint sensing device 10 during the read phase.

Figure 5:
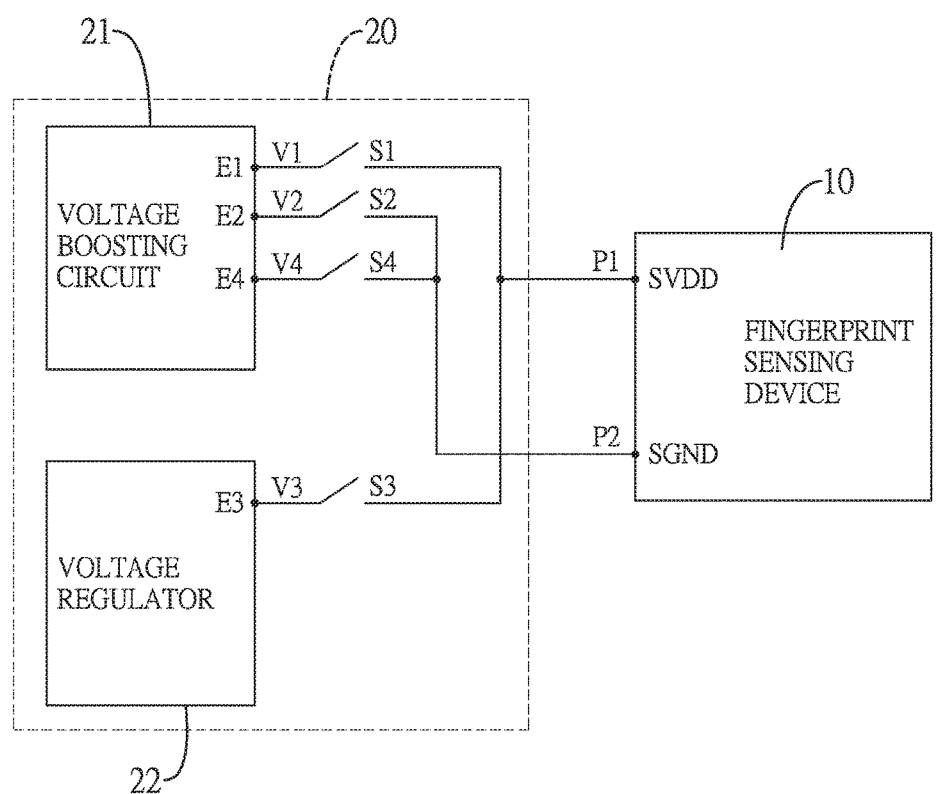
FIG. 5 is a functional block diagram of a second embodiment of the fingerprint sensing system in accordance with the present invention.

In an embodiment, ground terminals of all elements of the power supply circuit 20 may be connected together and have the same ground voltage VGND. If the fourth voltage terminal E4 in FIG. 3 is a ground terminal, the fourth voltage terminal E4 may be provided by the voltage boosting circuit 21 as shown in FIG. 5, or other voltage terminal with the ground voltage VGND. Circuit operation of the embodiment in FIG. 5 can be referred to the timing sequence diagram in FIG. 4 and is not elaborated here.

Figure 6:
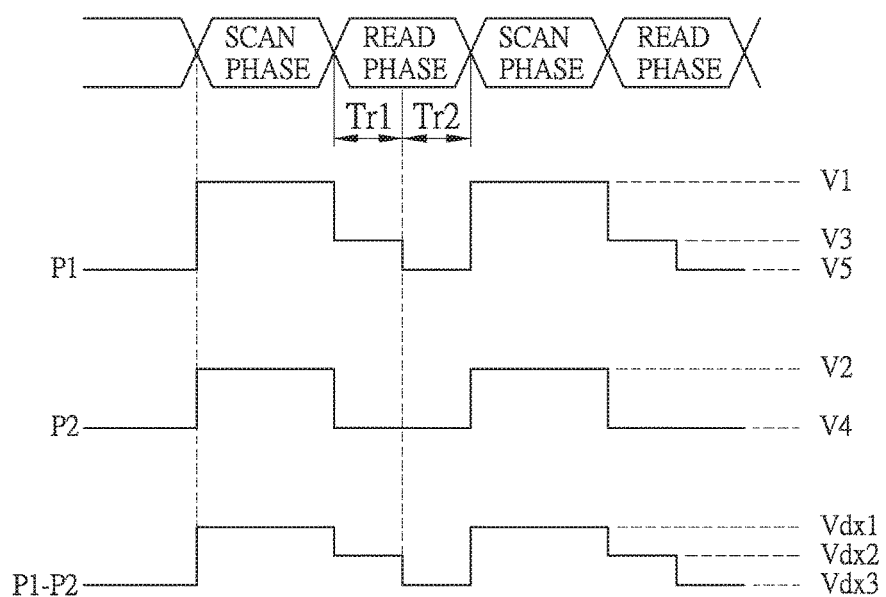
FIG. 6 is a waveform of a second embodiment of a first power signal and a second power signal in accordance with the present invention.

The read phase of the fingerprint sensing device 10 can be divided into a first read period Tr1 and a second read period Tr2, wherein the first read period Tr1 is earlier than the second read period Tr2. FIG. 6 shows the second embodiment of an operating method in accordance with the present invention. Compared to FIG. 2, the high-voltage input terminal SVDD has a different state during the second read period Tr2 of the read phase in FIG. 6. As shown by the first power signal P1 and the second power signal P2 in FIG. 6, during the first read period Tr1, the third voltage V3 is provided to the high-voltage input terminal SVDD, and the fourth voltage V4 is supplied to the low-voltage input terminal SGND by the power supply circuit 20. Therefore, the voltage difference between the high-voltage input terminal SVDD and the low-voltage input terminal SGND during the first read period Tr1 is the second voltage difference Vdx2.

During the second read period Tr2 of the read phase, the power supply circuit 20 supplies the fifth voltage V5 to the high-voltage input terminal SVDD and still supplies the fourth voltage V4 to the low-voltage input terminal SGND. The fifth voltage V5 is less than the third voltage V3. The voltage difference between the high-voltage input terminal SVDD and the low-voltage input terminal SGND is a third voltage difference Vdx3. The third voltage difference Vdx3 is a difference value obtained by subtracting the fourth voltage V4 from the fifth voltage V5 (Vdx3=V5−V4). The third voltage difference Vdx3 is less than the second voltage difference Vdx2. Other operation may be referred to the description associated with FIG. 2 and is not elaborated here.

As an example, the first voltage V1 to the fifth voltage V5 according to the embodiment of FIG. 6 may be as follows:

the first voltage $V1=A*VDD$ the second voltage $V2=(A-1)*VDD$ the third voltage $V3=B*VDD$ the fourth voltage $V4=VGND$ the fifth voltage $V5=M*VDD$ where A is a positive number or a positive integer greater than 1, in an embodiment is equal to 2; 1>B>M; VGND is a ground voltage externally supplied to the power supply circuit 20 and may be for example, zero; and VDD is an operating voltage externally supplied to the power supply circuit 20. In this example, the first voltage difference Vdx1 between the high-voltage input terminal SVDD and the low-voltage input terminal SGND during the scan phase is equal to V1−V2=VDD. The second voltage difference Vdx2 during the first read period Tr1 is equal to V3−V4=B*VDD. The third voltage difference Vdx3 during the second read period Tr2 is equal to V5−V4=M*VDD. Vdx1(VDD)>Vdx2 (B*VDD)>Vdx3(M*VDD).

According to the embodiment in FIG. 6, the first power signal P1 during the read phase is first dropped to the third voltage V3, and then further dropped from the third voltage V3 to the fifth voltage V5. In one embodiment, the analog circuits in the fingerprint sensing device 10 processes the fingerprint sensing signal during the first read period Tr1. The third voltage V3 and the second voltage difference Vx2 may be the minimum voltages required by the analog circuit during the first read period Tr1. After the operation of analog circuit is completed during the first read period Tr1, the voltage of the high-voltage input terminal SVDD is dropped to the fifth voltage V5 during the second read period Tr2 for enhancing power-saving effect.

Figure 7:
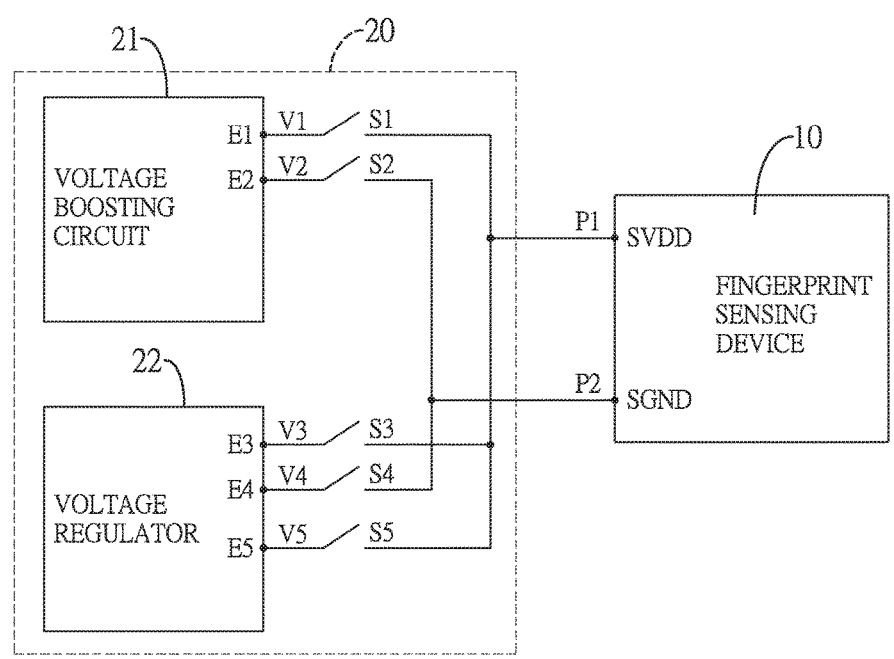
FIG. 7 is a functional block diagram of a third embodiment of the fingerprint sensing system in accordance with the present invention.

The embodiment shown in FIG. 7 is used to implement the operation as shown in FIG. 6. Compared to FIG. 3, the embodiment of FIG. 7 further comprises a fifth voltage terminal E5 and a fifth switch S5. In FIG. 7, the voltage regulator 22 further comprises a fifth voltage terminal E5 for providing the fifth voltage V5. The fifth voltage V5 is greater than the fourth voltage V4 and is less than the third voltage V3. The fifth switch S5 is coupled between the fifth voltage terminal E5 and the high-voltage input terminal SVDD of the fingerprint sensing device 10. Other details and variations of this embodiment may be referred to the descriptions of FIGS. 3 and 5 and are not elaborated here.

Figure 8:
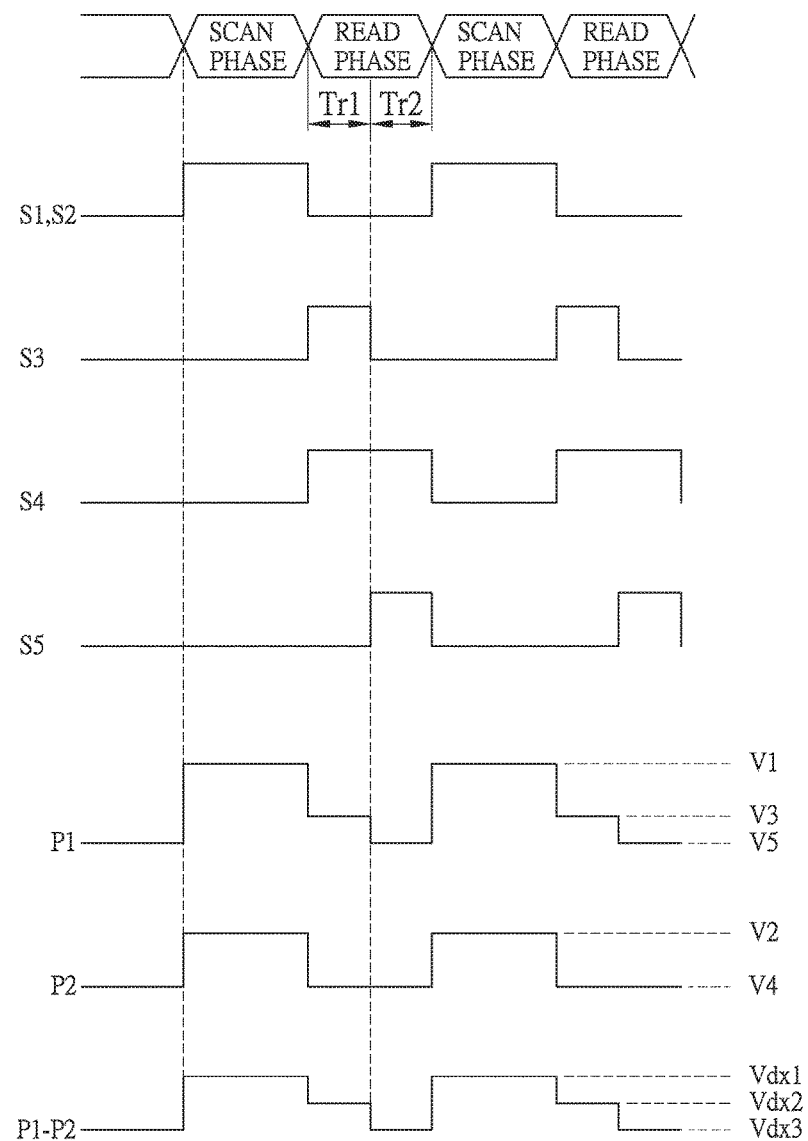
FIG. 8 is a timing sequence diagram of the fingerprint sensing system in FIG. 7.

FIG. 8 is a timing sequence diagram for the embodiment in FIG. 7. During the scan phase of the fingerprint sensing device 10, the first switch S1 and the second switch S2 are closed and the third switch S3 to the fifth switch S5 are open. In this time, the voltage of the first power signal is the first voltage V1, the voltage of the second power signal P2 is the second voltage V2, and the voltage difference between the high-voltage input terminal SVDD and the low-voltage input terminal SGND is the first voltage difference Vdx1. During the first read period Tr1, the first switch S1, the second switch S2 and the fifth switch S5 are open and the third switch S3 and the fourth switch S4 are closed. In this time, the voltage of the first power signal P1 is the third voltage V3, the voltage of the second power signal P2 is the fourth voltage V4, and the voltage difference between the high-voltage input terminal SVDD and the low-voltage input terminal SGND is the second voltage difference Vdx2. The second voltage difference Vdx2 is less than the first voltage difference Vdx1. During the second read period Tr2 of the read phase, the first switch S1, the second switch S2 and the third switch S3 are open and the fourth switch S4 and the fifth switch S5 are closed. In this time, the voltage of the first power signal P1 is the fifth voltage V5, the voltage of the second power signal P2 is the fourth voltage V4, and the voltage difference between the high-voltage input terminal SVDD and the low-voltage input terminal SGND is the third voltage difference Vdx3. The third voltage difference Vdx3 is less than the second voltage difference Vdx2.

Figure 9:
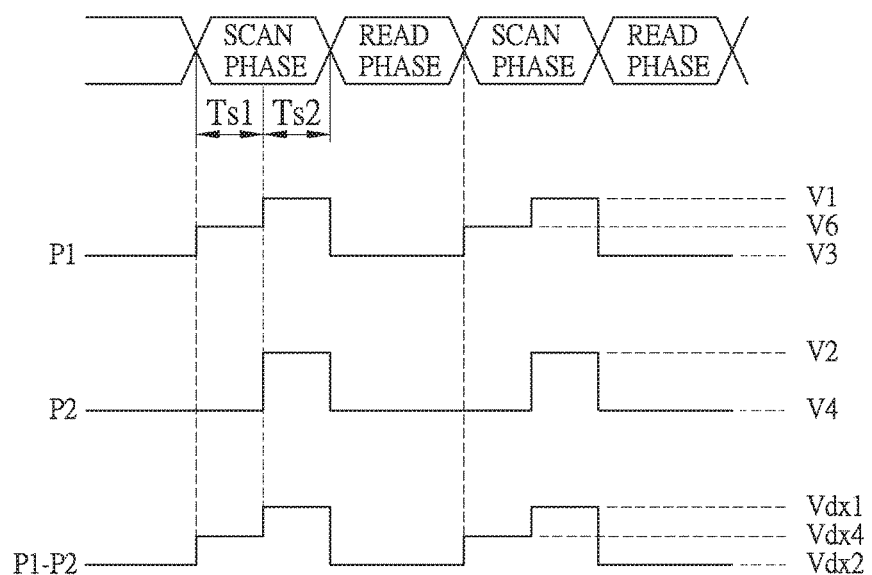
FIG. 9 is a waveform of a third embodiment of a first power signal and a second power signal in accordance with the present invention.

The scan phase of the fingerprint sensing device 10 can be divided into a first scan period Ts1 and a second scan period Ts2, wherein the first scan period Ts1 is earlier than the second scan period Ts2. FIG. 9 shows a third embodiment of the operating method in accordance with the present invention. Compared to FIG. 2, the embodiment of FIG. 9 has a different state of the high-voltage input terminal SVDD and the low-voltage input terminal SGND during the first scan period Ts1 of the scan phase. As shown by the first power signal P1 and the second power signal P2 in FIG. 9, during the second scan period Ts2 of the scan phase, the first voltage V1 is provided to the high-voltage input terminal SVDD and the second voltage V2 is provided to the low-voltage input terminal SGND. The voltage difference between the high-voltage input terminal SVDD and the low-voltage input terminal SGND during the second scan period Ts2 is the first voltage difference Vdx1. During the first scan period Ts1, the power supply circuit 20 supplies a sixth voltage V6 to the high-voltage input terminal SVDD and the fourth voltage V4 to the low-voltage input terminal SGND. The sixth voltage V6 is less than the first voltage V1 and is greater than the third voltage V3. The voltage difference between the high-voltage input terminal SVDD and the low-voltage input terminal SGND during the first scan period Ts1 is a fourth voltage difference Vdx4. The fourth voltage difference Vdx4 is a difference value obtained by subtracting the fourth voltage V4 from the sixth voltage V6 (Vdx4=V6−V4). The fourth voltage difference Vdx4 is less than the first voltage difference Vdx1 and is greater than the second voltage difference Vdx2. Other operation may be referred to the description associated with FIG. 2 and is not elaborated here.

As an example according to the FIG. 9, the first voltage V1 to the fourth voltage V4 and the sixth voltage V6 are as follows:

the first voltage $V1=A*VDD$ the second voltage $V2=(A-1)*VDD$ the third voltage $V3=B*VDD$ the fourth voltage $V4=VGND$ the sixth voltage $V6=N*VDD$ where A is a positive number or a positive integer greater than 1, in an embodiment is equal to 2; N>B and N may be a positive number or positive integer greater than, less than or equal to 1, and proper selection of N and VGND can maintain the fourth voltage difference Vdx4 to be less than the first voltage difference Vdx1; VGND is a ground voltage externally supplied to the power supply circuit 20 and may be for example, zero; and VDD is an operating voltage externally supplied to the power supply circuit 20.

If the VGND is zero, the fourth voltage difference Vdx4 between the high-voltage input terminal SVDD and the low-voltage input terminal SGND during the first scan period Ts1 is equal to V6−V4=N*VDD, and the first voltage difference Vdx1 during the second scan period Ts2 is equal to V1−V2=VDD. The second voltage difference Vdx2 during the read phase is equal to V3−V4=B*VDD. Vdx1(VDD)>Vdx4(N*VDD)>Vdx2(B*VDD).

Figure 10:
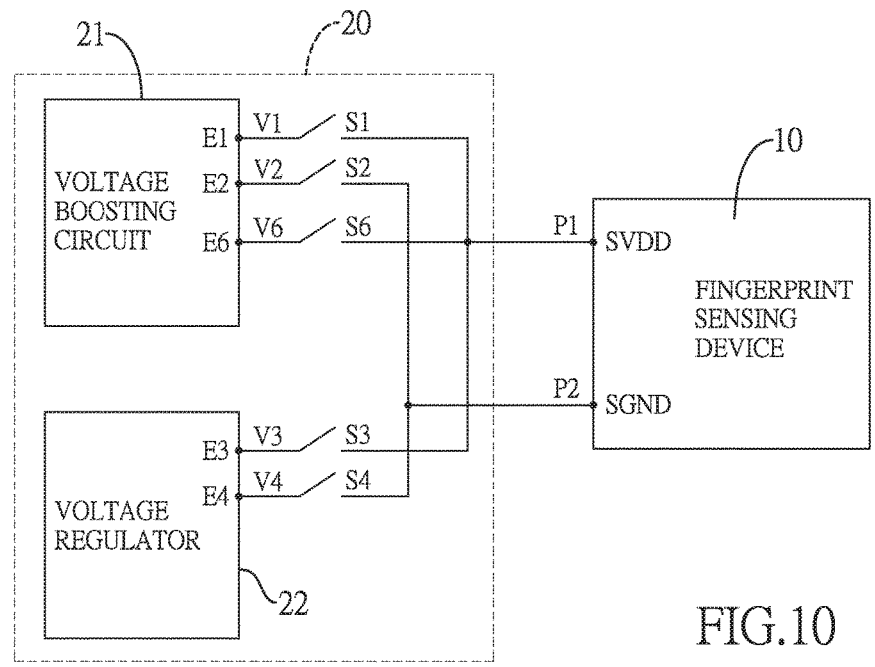
FIG. 10 is a functional block diagram of a fourth embodiment of the fingerprint sensing system in accordance with the present invention.
Figure 11:
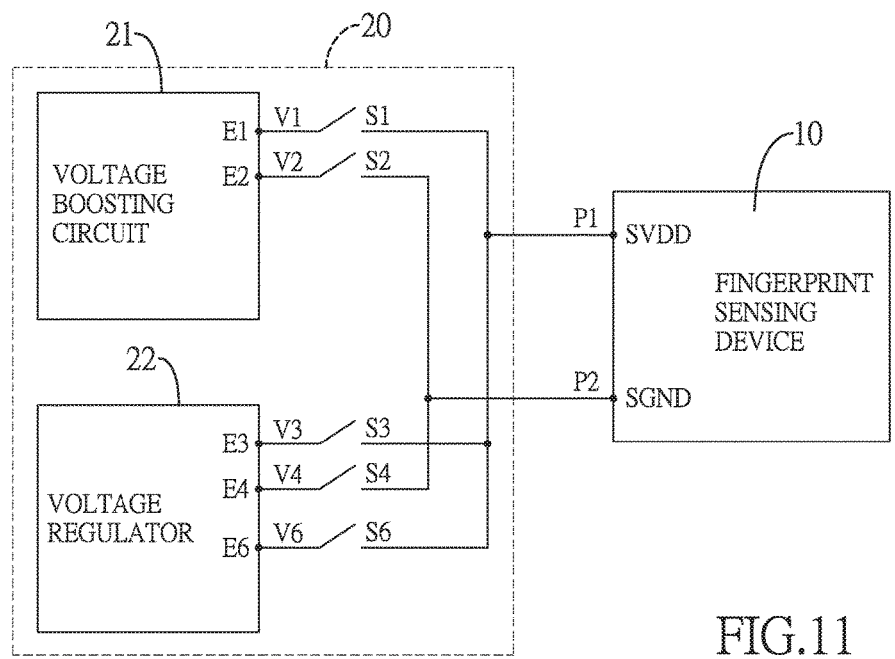
FIG. 11 is a functional block diagram of a fifth embodiment of the fingerprint sensing system in accordance with the present invention.

The embodiments shown in FIGS. 10 and 11 may be used to implement operation shown in FIG. 9. Compared to the embodiment of FIG. 3, FIGS. 10 and 11 further comprises a sixth voltage terminal E6 and a sixth switch S6. The sixth voltage terminal E6 is used to provide the sixth voltage V6. The sixth voltage V6 is less than the first voltage V1 and is greater than the third voltage V3. The sixth switch S6 is coupled between the sixth voltage terminal E6 and the high-voltage input terminal SVDD of the fingerprint sensing device 10. In FIG. 10 the sixth voltage V6 is greater than or equal to the operating voltage VDD, and the sixth voltage terminal E6 is provided by the voltage boosting circuit 21. In other words, the voltage boosting circuit 21 supplies the sixth voltage V6. In FIG. 11 the sixth voltage V6 is less than or equal to the operating voltage VDD, and the sixth voltage terminal E6 is provided by the voltage regulator 22. In other words, the voltage regulator 22 supplies the sixth voltage V6. If the sixth voltage V6 is an external operating voltage VDD supplied to the power supply circuit 20, the sixth voltage terminal E6 may be provided by other circuit element inside the power supply circuit 20, or provided by other voltage terminal having the operating voltage VDD. Other details and variations may be referred to the description in FIGS. 3 and 5 and are not elaborated here.

Figure 12:
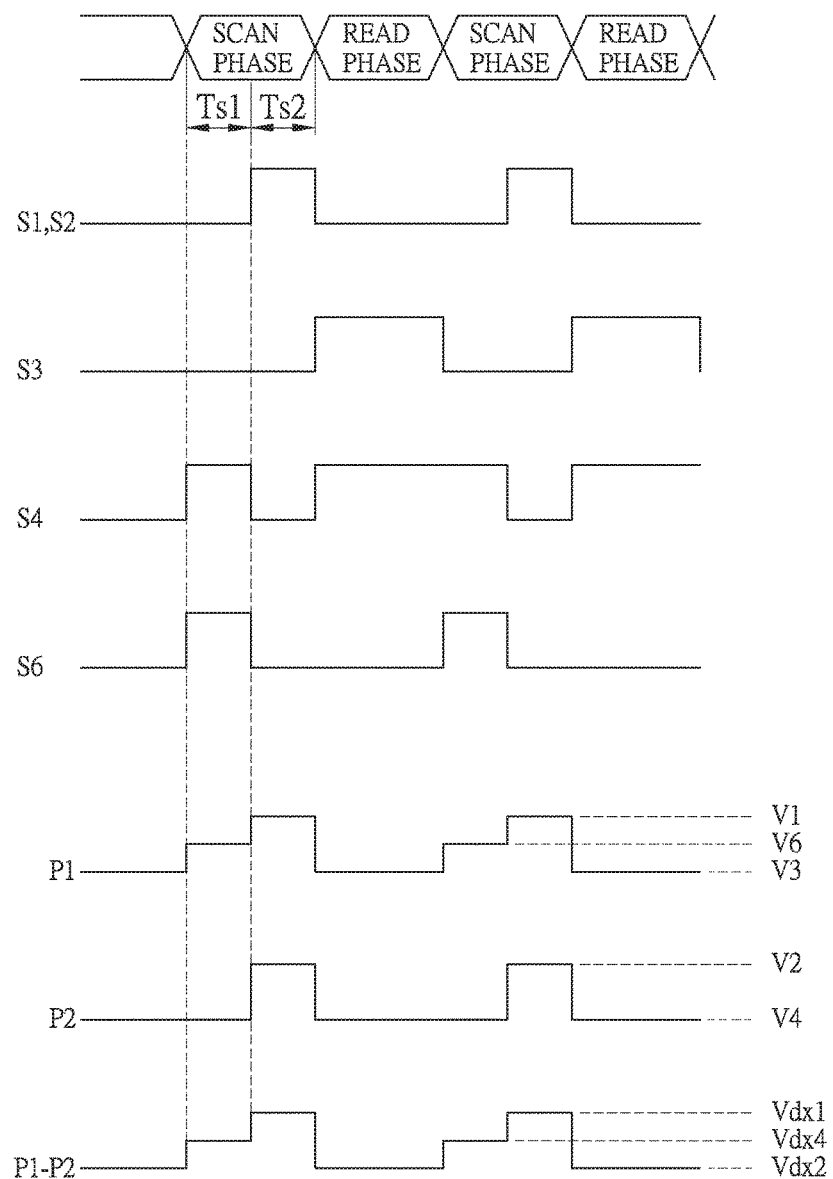
FIG. 12 is a timing sequence diagram of the fingerprint sensing systems in FIGS. 10 and 11.

With reference to FIG. 12, a timing sequence diagram for the embodiments of FIGS. 10 and 11 is shown. During the first scan period Ts1, the first switch S1, the second switch S2 and the third switch S3 are open and the fourth switch S4 and the sixth switch S6 are closed. In this time, the voltage of the first power signal P1 is the sixth voltage V6, the voltage of the second power signal P2 is the fourth voltage V4, and the voltage difference between the high-voltage input terminal SVDD and the low-voltage input terminal SGND is the fourth voltage difference Vdx4. During the second scan period Ts2, the first switch S1 and the second switch S2 are closed and the third switch S3, the fourth switch S4 and the sixth switch S6 are open. In this time, the voltage of the first power signal P1 is the first voltage V1, the voltage of the second power signal P2 is the second voltage V2, and the voltage difference between the high-voltage input terminal SVDD and the low-voltage input terminal SGND is the first voltage difference Vdx1. The fourth voltage difference Vdx4 is less than the first voltage difference Vdx1. During the read phase, the first switch S1, the second switch S2 and the sixth switch S6 are open, and the third switch S3 and the fourth switch S4 are closed. In this time, the voltage of the first power signal P1 is the third voltage V3, the voltage of the second power signal P2 is the fourth voltage V4, and the voltage difference between the high-voltage input terminal SVDD and the low-voltage input terminal SGND is the second voltage difference Vdx2. The second voltage difference Vdx2 is less than the fourth voltage difference Vdx4.

Figure 13:
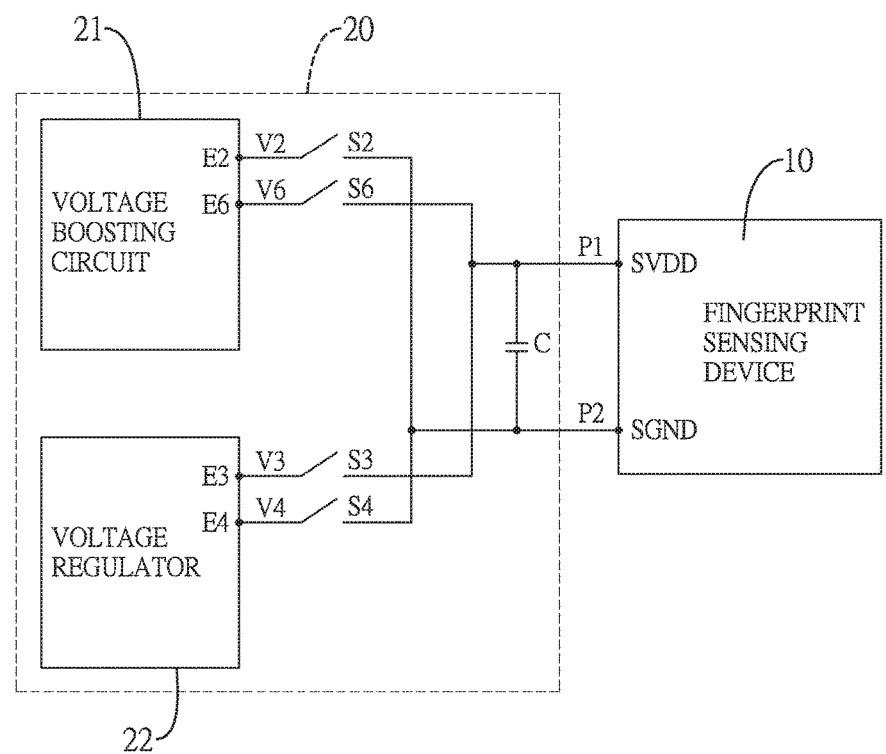
FIG. 13 is a functional block diagram of a sixth embodiment of the fingerprint sensing system in accordance with the present invention.
Figure 14:
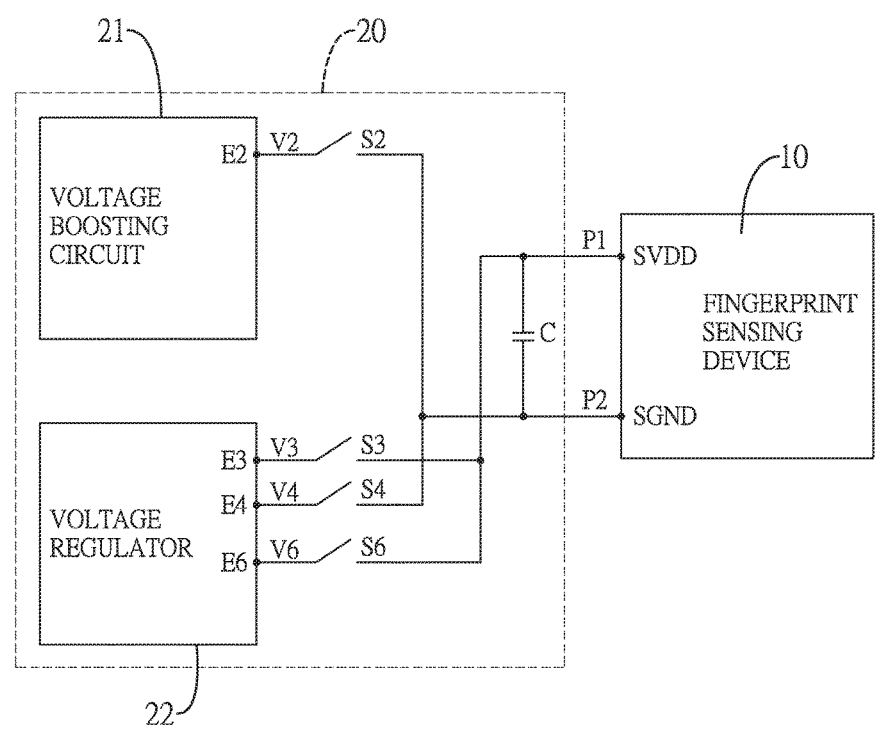
FIG. 14 is a functional block diagram of a seventh embodiment of the fingerprint sensing system in accordance with the present invention.

In comparison to FIGS. 10 and 11, the first voltage terminal E1 is omitted and a capacitor C is added in the embodiments of FIGS. 13 and 14. In the embodiments of FIGS. 13 and 14, the capacitor C is coupled between the high-voltage input terminal SVDD and the low-voltage input terminal SGND. The voltage boosting circuit 21 or the voltage regulator 22 does not provide the first voltage V1. The power supply circuit 20 provides a high voltage to the high-voltage input terminal SVDD of the fingerprint sensing device 10 through the combination of the second voltage V2 and the capacitor C during the scan phase. Other details and variations may be referred to the description in FIGS. 10 and 11 and are not elaborated here.

Figure 15:
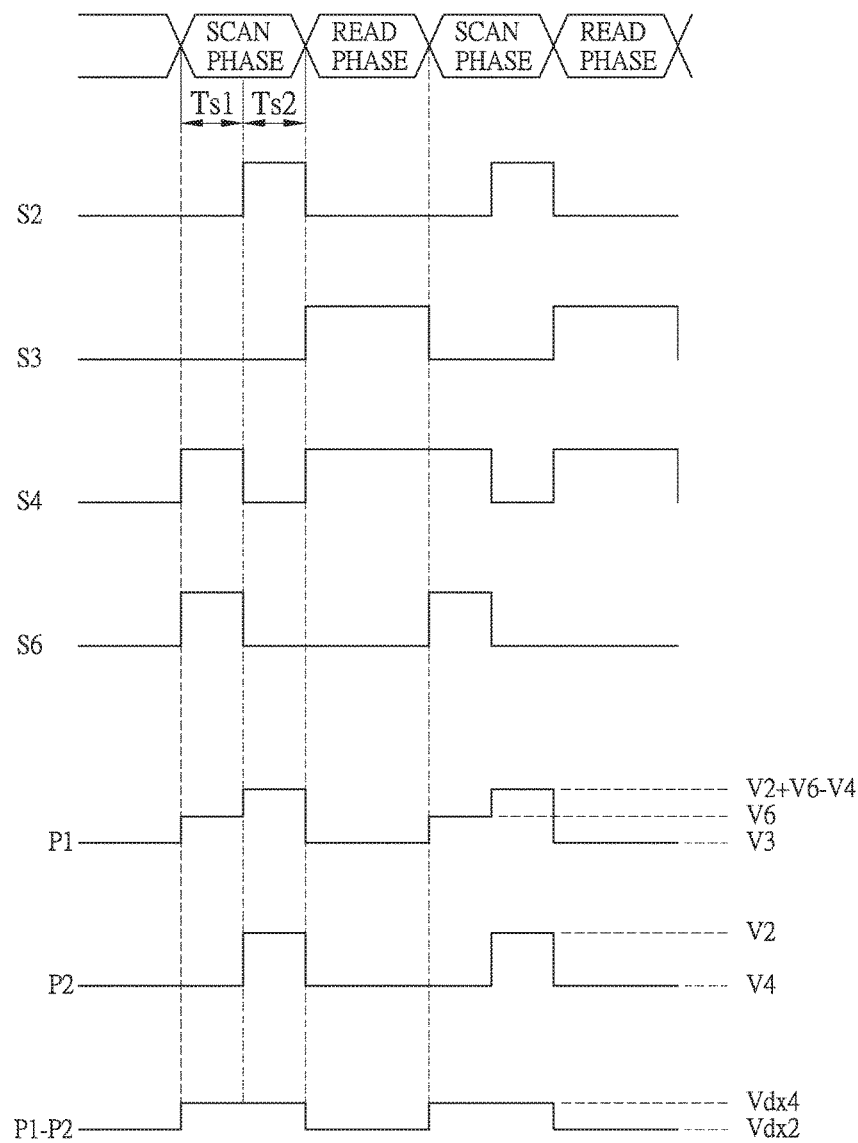
FIG. 15 is a timing sequence diagram of the fingerprint sensing systems in FIGS. 13 and 14.

With reference to FIG. 15, a timing sequence diagram for the embodiments in FIGS. 13 and 14 is shown. During the first scan period Ts1 of the scan phase of the fingerprint sensing device 10, the second switch S2 and the third switch S3 are open, and the fourth switch S4 and the sixth switch S6 are closed. In this time, the voltage of the first power signal P1 is the sixth voltage V6, the voltage of the second power signal P2 is the fourth voltage V4, the fourth voltage difference Vdx4 between the high-voltage input terminal SVDD and the low-voltage input terminal SGND is equal to Vdx4=V6−V4, and the capacitor C is charged. During the second scan period Ts2 of the scan phase, the second switch S2 is closed, and the third switch S3, the fourth switch S4 and the sixth switch S6 are open. In this time, the voltage of the first power signal is V2+V6−V4, the voltage of the second power signal P2 is the second voltage V2, and the voltage difference between the high-voltage input terminal SVDD and the low-voltage input terminal SGND is the fourth voltage difference Vdx4. During the read phase, the first switch S1, the second switch S2 and the sixth switch S6 are open, and the third switch S3 and the fourth switch S4 are closed. In this time, the voltage of the first power signal P1 is the third voltage V3, the voltage of the second power signal P2 is the fourth voltage V4, and the voltage difference between the high-voltage input terminal SVDD and the low-voltage input terminal SGND is the second voltage difference Vdx2. The second voltage difference Vdx2 is less than the fourth voltage difference Vdx4.

In an embodiment according to FIG. 15, the second voltage V2 to the fourth voltage V4 and the sixth voltage V6 are as follows:

the second voltage $V2=(A−1)*VDD$ the third voltage $V3=B*VDD$ the fourth voltage $V4=VGND$ the sixth voltage $V6=VDD$ where A is a positive number or a positive integer greater than 1 or greater than or equal to 2; B is less than 1; VGND is a ground voltage externally supplied to the power supply circuit 20 and may be for example, zero; and VDD is an operating voltage externally supplied to the power supply circuit 20. In this embodiment, the fourth voltage difference Vdx4 between the high-voltage input terminal SVDD and the low-voltage input terminal SGND during the scan phase is equal to V6−V4=VDD, the second voltage difference Vdx2 during the read phase is equal to V3−V4=B*VDD, and Vdx4(VDD)>Vdx2(B*VDD).

As shown in FIG. 15, during the first scan period Ts1, the power supply circuit 20 in FIGS. 13 and 14 provides the sixth voltage V6 to the high-voltage input terminal SVDD and provides the fourth voltage V4 to the low-voltage input terminal SGND. The voltage difference between the high-voltage input terminal SVDD and the low-voltage input terminal SGND during the first scan period Ts1 is the fourth voltage difference Vdx4. During the second scan period Ts2, the power supply circuit 20 provides the second voltage V2 to the low-voltage input terminal SGND. During the read phase, the power supply circuit 20 provides the third voltage V3 to the high-voltage input terminal SVDD and the fourth voltage V4 to the low-voltage input terminal SGND. The voltage difference between the high-voltage input terminal SVDD and the low-voltage input terminal SGND during the read phase is the second voltage difference Vdx2.

In comparison to FIGS. 10 and 11, the voltage boosting circuit 21 in FIGS. 13 and 14 does not need to provide a first voltage V1, and the high-voltage input terminal SVDD of the fingerprint sensing device 10 can still obtain an input voltage higher than the second voltage V2 during the scan phase. Therefore, requirement and complexity of designing or manufacturing the voltage boosting circuit 21 can be reduced. From another perspective of view, if the voltage boosting circuit 21 in FIG. 13 provides the first voltage V1 but eliminates the second voltage V2, the high-voltage input terminal SVDD may receive a voltage higher than the first voltage V1, which means that higher voltage may be supplied to the multiple sensors 11 to obtain higher fingerprint sensing signal.

Providing the first voltage V1 to the high-voltage input terminal SVDD in the foregoing embodiments may be implemented by the configuration show in FIGS. 13 and 14. That is, the capacitor C is first charged during the first scan period Ts1, and then the second voltage V2 is provided to the low-voltage input terminal SGND during the second scan period Ts2 so that the high-voltage input terminal SVDD can receive the first voltage V1. The first voltage V1 generated by the configuration show in FIG. 13 is equal to V2+V6−V4, and the first voltage difference Vdx1 is equal to the fourth voltage difference Vdx4, i.e. both being V6−V4. In FIGS. 9 and 15 the fourth voltage difference Vdx4 is not greater than the first voltage V1.

Lever-triggering may be used in the operation of the foregoing embodiments. Each switch in the foregoing embodiment may be opened or closed earlier or later. Scanning the sensors 11 is performed when the first voltage difference Vdx1 is between the high-voltage input terminal SVDD and the low-voltage input terminal SGND. When the second voltage difference Vdx2 is between the high-voltage input terminal SVDD and the low-voltage input terminal SGND, analog circuits read and process the fingerprint sensing signals of the sensors 11. In certain embodiments, the voltage boosting circuit 21 is used to provide a voltage greater than or equal to the VDD and the voltage regulator 22 is used to provide a voltage less than or equal to the VDD.

The combination of foregoing embodiments is feasible. For example, the embodiments in FIGS. 6 to 8 may be combined with the embodiments in FIGS. 9 to 15, such that the fourth voltage difference Vdx4 and the first voltage difference Vdx1 are between the high-voltage input terminal SVDD and the low-voltage input terminal SGND during the scan phase, and the second voltage difference Vdx2 and the third voltage difference Vdx3 are between the high-voltage input terminal SVDD and the low-voltage input terminal SGND during the read phase.

In one embodiment, the voltage of the high-voltage input terminal SVDD may be used as an operating voltage of the fingerprint sensing device 10, and the voltage of the low-voltage input terminal SGND may be used as a ground voltage of the fingerprint sensing device 10.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. An operating method for a fingerprint sensing device, wherein the fingerprint sensing device comprises a high-voltage input terminal and a low-voltage input terminal, the high-voltage input terminal and the low-voltage input terminal are coupled to a power supply circuit to power the fingerprint sensing device for sensing a fingerprint, the method comprising:

in a scan phase of the fingerprint sensing device, providing a first voltage to the high-voltage input terminal and providing a second voltage to the low-voltage input terminal to cause a first voltage difference between the high-voltage input terminal and the low-voltage input terminal, wherein the first voltage is greater than the second voltage; and in a read phase of the fingerprint sensing device, providing a third voltage to the high-voltage input terminal and providing a fourth voltage to the low-voltage input terminal to cause a second voltage difference between the high-voltage input terminal and the low-voltage input terminal, wherein the third voltage is greater than the fourth voltage;

wherein the first voltage difference is greater than the second voltage difference.

2. The operating method as claimed in claim 1, wherein the read phase comprises a first read period and a second read period and the first read period is earlier than the second read period, wherein the step of providing the third voltage to the high-voltage input terminal is performed during the first read period to cause the second voltage difference between the high-voltage input terminal and the low-voltage input terminal during the first read period;

the operating method further comprises:

providing a fifth voltage to the high-voltage input terminal during the second read period to generate a third voltage difference between the high-voltage input terminal and the low-voltage input terminal during the second read period, wherein the fifth voltage is less than the third voltage;

wherein the third voltage difference is less than the second voltage difference.

3. The operating method as claimed in claim 1, wherein the scan phase comprises a first scan period and a second scan period, and the first scan period is earlier than the second scan period, wherein the step of providing the first voltage to the high-voltage input terminal and providing the second voltage to the low-voltage input terminal is performed during the second scan period to cause the first voltage difference between the high-voltage input terminal and the low-voltage input terminal during the second scan period;

the operating method further comprises:

providing a sixth voltage to the high-voltage input terminal and providing the fourth voltage to the low-voltage input terminal to cause a fourth voltage difference between the high-voltage input terminal and the low-voltage input terminal during the first scan period, wherein the sixth voltage is less than the first voltage and is greater than the third voltage;

wherein the fourth voltage difference is not greater than the first voltage difference but is greater than the second voltage difference.

4. The operating method as claimed in claim 1, wherein a capacitor is coupled between the high-voltage input terminal and the low-voltage input terminal, the scan phase comprises a first scan period and a second scan period, and the first scan period is earlier than the second scan period;

the operating method further comprises:

providing a sixth voltage to the high-voltage input terminal and providing the fourth voltage to the low-voltage input terminal to cause a fourth voltage difference between the high-voltage input terminal and the low-voltage input terminal during the first scan period, wherein the sixth voltage is greater than the third voltage, and providing the second voltage to the low-voltage input terminal during the second scan period so as to implement the step of providing the first voltage to the high-voltage input terminal;

wherein the fourth voltage difference is equal to the first voltage difference.

5. The operating method as claimed in claim 3, wherein the read phase comprises a first read period and a second read period and the first read period is earlier than the second read period, wherein the step of providing the third voltage to the high-voltage input terminal is performed during the first read period to cause the second voltage difference between the high-voltage input terminal and the low-voltage input terminal during the first read period;

the operating method further comprises:

providing a fifth voltage to the high-voltage input terminal during the second read period to generate a third voltage difference between the high-voltage input terminal and the low-voltage input terminal during the second read period, wherein the fifth voltage is less than the third voltage;

wherein the third voltage difference is less than the second voltage difference.

6. The operating method as claimed in claim 4, wherein the read phase comprises a first read period and a second read period and the first read period is earlier than the second read period, wherein the step of providing the third voltage to the high-voltage input terminal is performed during the first read period to cause the second voltage difference between the high-voltage input terminal and the low-voltage input terminal during the first read period;

the operating method further comprises:

providing a fifth voltage to the high-voltage input terminal during the second read period to generate a third voltage difference between the high-voltage input terminal and the low-voltage input terminal during the second read period, wherein the fifth voltage is less than the third voltage;

wherein the third voltage difference is less than the second voltage difference.

7. The operating method as claimed in claim 1, wherein the third voltage is less than an operating voltage provided to the power supply circuit.

8. The operating method as claimed in claim 1, wherein the fourth voltage is a ground voltage of the power supply circuit.

9. The operating method as claimed in claim 3, wherein the sixth voltage is equal to an operating voltage provided to the power supply circuit.

10. The operating method as claimed in claim 4, wherein the sixth voltage is equal to an operating voltage provided to the power supply circuit.

11. A fingerprint sensing system comprising:
a fingerprint sensing device comprising, a high-voltage input terminal and a low-voltage input terminal; and
a power supply circuit coupled to the high-voltage input terminal and the low-voltage input terminal of the fingerprint sensing device, and supplying a first voltage, a second voltage, a third voltage and a fourth voltage, wherein the first voltage is greater than the second voltage, and the third voltage is greater than the fourth voltage;
wherein in a scan phase of the fingerprint sensing device, the power supply circuit provides the first voltage to the high-voltage input terminal and provides the second voltage to the low-voltage input terminal to cause a first voltage difference between the high-voltage input terminal and the low-voltage input terminal;
in a read phase of the fingerprint sensing device, the power supply circuit provides the third voltage to the high-voltage input terminal and provides the fourth voltage to the low-voltage input terminal to cause a second voltage difference between the high-voltage input terminal and the low-voltage input terminal; and
the first voltage difference is greater than the second voltage difference.

12. The fingerprint sensing system as claimed in claim 11, wherein the power supply circuit comprises:
a voltage boosting circuit providing the first voltage and the second voltage, wherein the first voltage is greater than the second voltage;
a voltage regulator providing the third voltage; and
a fourth voltage terminal for providing the fourth voltage, wherein the third voltage is greater than the fourth voltage.

13. The fingerprint sensing system as claimed in claim 12, wherein the voltage regulator further provides a fifth voltage, and the fifth voltage is greater than the fourth voltage and is less than the third voltage;
wherein the read phase comprises a first read period and a second read period, and the first read period is earlier than the second read period;
wherein during the first read period, the power supply circuit provides the third voltage to the high-voltage input terminal to cause the second voltage difference between the high-voltage input terminal and the low-voltage input terminal, and
during the second read period, the power supply circuit provides the fifth voltage to the high-voltage input terminal to cause a third voltage difference between the high-voltage input terminal and the low-voltage input terminal;
wherein the third voltage difference is less than the second voltage difference.

14. The fingerprint sensing system as claimed in claim 12, wherein the power supply circuit further comprises a sixth voltage terminal for providing a sixth voltage, and the sixth voltage is less than the first voltage and is greater than the third voltage;
the scan phase comprises a first scan period and a second scan period, and the first scan period is earlier than the second scan period;
wherein during the first scan period, the power supply circuit provides the sixth voltage to the high-voltage input terminal and provides the fourth voltage to the low-voltage input terminal to cause a fourth voltage difference between the high-voltage input terminal and the low-voltage input terminal, and
during the second scan period, the power supply circuit provides the first voltage to the high-voltage input terminal and provides the second voltage to the low-voltage input terminal to cause the first voltage difference between the high-voltage input terminal and the low-voltage input terminal;
wherein the fourth voltage difference is not greater than the first voltage difference but is greater than the second voltage difference.

15. The fingerprint sensing system as claimed in claim 11, wherein the power supply circuit comprises:
a voltage boosting circuit providing the second voltage;
a voltage regulator providing the third voltage;
a fourth voltage terminal for providing the fourth voltage, wherein the third voltage is greater than the fourth voltage;
a sixth voltage terminal for providing the sixth voltage, wherein the sixth voltage is greater than the third voltage; and
a capacitor coupled between the high-voltage input terminal and the low-voltage input terminal;
wherein the scan phase of the fingerprint sensing device comprises a first scan period and a second scan period, and the first scan period is earlier than the second scan period;
wherein during the first scan period, the power supply circuit provides the sixth voltage to the high-voltage input terminal and provides the fourth voltage to the low-voltage input terminal to cause a fourth voltage difference between the high-voltage input terminal and the low-voltage input terminal, and
during the second scan period, the power supply circuit provides the second voltage to the low-voltage input terminal, thus providing the first voltage to the high-voltage input terminal during the scan phase is accomplished;
wherein the fourth voltage difference is equal to the first voltage difference.

16. The fingerprint sensing system as claimed in claim 14, wherein the voltage regulator further provides a fifth voltage, and the fifth voltage is greater than the fourth voltage and is less than the third voltage;
wherein the read phase comprises a first read period and a second read period, and the first read period is earlier than the second read period;
wherein during the first read period, the power supply circuit provides the third voltage to the high-voltage input terminal to cause the second voltage difference between the high-voltage input terminal and the low-voltage input terminal, and
during the second read period, the power supply circuit provides the fifth voltage to the high-voltage input terminal to cause a third voltage difference between the high-voltage input terminal and the low-voltage input terminal;

wherein the third voltage difference is less than the second voltage difference.

17. The fingerprint sensing system as claimed in claim 15, wherein the voltage regulator further provides a fifth voltage, and the fifth voltage is greater than the fourth voltage and is less than the third voltage;
wherein the read phase comprises a first read period and a second read period, and the first read period is earlier than the second read period;
wherein during the first read period, the power supply circuit provides the third voltage to the high-voltage input terminal to cause the second voltage difference between the high-voltage input terminal and the low-voltage input terminal, and
during the second read period, the power supply circuit provides the fifth voltage to the high-voltage input terminal to cause a third voltage difference between the high-voltage input terminal and the low-voltage input terminal;
wherein the third voltage difference is less than the second voltage difference.

18. The fingerprint sensing system as claimed in claim 11, wherein the third voltage is less than an operating voltage supplied to the power supply circuit.

19. The fingerprint sensing system as claimed in claim 11, wherein the fourth voltage is a ground voltage of the power supply circuit.

20. The fingerprint sensing system as claimed in claim 14, wherein the sixth voltage is equal to an operating voltage provided to the power supply circuit.

21. The fingerprint sensing system as claimed in claim 15, wherein the sixth voltage is equal to an operating voltage provided to the power supply circuit.

22. A fingerprint sensing device comprising:
multiple sensors; and
a high-voltage input terminal and a low-voltage input terminal, wherein the high-voltage input terminal and the low-voltage input terminal are for coupling to a power supply circuit that supplies power to the fingerprint sensing device for sensing a fingerprint by the multiple sensors;
wherein the fingerprint sensing device comprises a scan phase and a read phase while sensing the multiple sensors, a first voltage difference is between the high-voltage input terminal and the low-voltage input terminal during the scan phase, and a second voltage difference is between the high-voltage input terminal and the low-voltage input terminal during the read phase;
wherein the first voltage difference is greater than the second voltage difference.

23. The fingerprint sensing device as claimed in claim 22, wherein during the scan phase, the high-voltage input terminal and the low-voltage input terminal respectively receive a first voltage and a second voltage provided by the power supply circuit, and during the read phase, the high-voltage input terminal and the low-voltage input terminal respectively receive a third voltage and a fourth voltage provided by the power supply circuit, wherein the first voltage is greater than the second voltage and the third voltage is greater than the fourth voltage.

24. The fingerprint sensing device as claimed in claim 23, the read phase comprises a first read period and a second read period, and the first read period is earlier than the second read period;
wherein during the first read period, the high-voltage input terminal and the low-voltage input terminal respectively receive the third voltage and the fourth voltage to cause the second voltage difference between the high-voltage input terminal and the low-voltage input terminal; and
during the second read period, the high-voltage input terminal receives a fifth voltage supplied from the power supply circuit, and the low-voltage input terminal receives the fourth voltage, such that a third voltage difference is caused between the high-voltage input terminal and the low-voltage input terminal, wherein the fifth voltage is less than the third voltage;
wherein the third voltage difference is less than the second voltage difference.

25. The fingerprint sensing device as claimed in claim 23, wherein the scan phase comprises a first scan period and a second scan period, and the first scan period is earlier than the second scan period;
wherein during the second scan period, the high-voltage input terminal and the low-voltage input terminal respectively receive the first voltage and the second voltage to cause the first voltage difference between the high-voltage input terminal and the low-voltage input terminal, and
during the first scan period, the high-voltage input terminal receives a sixth voltage supplied from the power supply circuit, and the low-voltage input terminal receives the fourth voltage, such that a fourth voltage difference is caused between the high-voltage input terminal and the low-voltage input terminal during the first scan period, wherein the sixth voltage is less than the first voltage and greater than the third voltage;
wherein the fourth voltage difference is not greater than the first voltage difference but is greater than the second voltage difference.

26. The fingerprint sensing device as claimed in claim 25, the read phase comprises a first read period and a second read period, and the first read period is earlier than the second read period;
wherein during the first read period, the high-voltage input terminal and the low-voltage input terminal respectively receive the third voltage and the fourth voltage to cause the second voltage difference between the high-voltage input terminal and the low-voltage input terminal; and
during the second read period, the high-voltage input terminal receives a fifth voltage supplied from the power supply circuit, and the low-voltage input terminal receives the fourth voltage, such that a third voltage difference is caused between the high-voltage input terminal and the low-voltage input terminal, wherein the fifth voltage is less than the third voltage;
wherein the third voltage difference is less than the second voltage difference.

27. The fingerprint sensing device as claimed in claim 23, wherein the third voltage is less than an operating voltage supplied to the power supply circuit.

28. The fingerprint sensing device as claimed in claim 23, wherein the fourth voltage is a ground voltage of the power supply circuit.

29. The fingerprint sensing device as claimed in claim 25, wherein the sixth voltage is equal to an operating voltage provided to the power supply circuit.

* * * * *